US011615798B2

(12) United States Patent
Grgac

(10) Patent No.: US 11,615,798 B2
(45) Date of Patent: *Mar. 28, 2023

(54) VOICE ACTIVATION USING A LASER LISTENER

(71) Applicant: MAGNA EXTERIORS INC., Concord (CA)

(72) Inventor: Steven S. Grgac, Mississauga (CA)

(73) Assignee: MAGNA EXTERIORS, INC., Concord (CA)

( * ) Notice: Subject to any disclaimer, the term of this patent is extended or adjusted under 35 U.S.C. 154(b) by 260 days.

This patent is subject to a terminal disclaimer.

(21) Appl. No.: 17/071,064

(22) Filed: Oct. 15, 2020

(65) Prior Publication Data

US 2021/0027782 A1 Jan. 28, 2021

Related U.S. Application Data

(63) Continuation of application No. 16/515,539, filed as application No. PCT/IB2018/050969 on Feb. 16, 2018, now Pat. No. 10,818,294.

(60) Provisional application No. 62/459,914, filed on Feb. 16, 2017.

(51) Int. Cl.
*G10L 15/24* (2013.01)
*B60R 16/037* (2006.01)
*B60R 25/25* (2013.01)
*B60W 50/08* (2020.01)
*G10L 15/22* (2006.01)
*H04R 23/00* (2006.01)
*B60J 5/04* (2006.01)
(Continued)

(52) U.S. Cl.
CPC ............ *G10L 15/24* (2013.01); *B60J 5/047* (2013.01); *B60R 16/0373* (2013.01); *B60R 25/257* (2013.01); *B60W 50/08* (2013.01); *G07C 9/00563* (2013.01); *G08C 23/00* (2013.01); *G10L 15/22* (2013.01); *H04R 23/008* (2013.01); *G10L 2015/223* (2013.01); *H04R 2499/13* (2013.01)

(58) Field of Classification Search
CPC ......... G10L 15/24; G10L 15/00; G10L 15/22; G10L 2015/223; B60J 5/047; B60R 16/0373; B60R 25/257; B60R 11/0247; B60R 11/0252; B60R 25/102; B60R 21/00; B60W 50/08; B60W 10/06; B60W 50/082; B60W 2420/62; G07C 9/00563; G08C 23/00; G08C 23/02; H04R 23/008; H04R 2499/13; H04R 23/00; H04R 1/406; G01H 9/00
See application file for complete search history.

(56) References Cited

U.S. PATENT DOCUMENTS 9,470,033 B1 * 10/2016 Dudar ............... E05F 15/73
2013/0157576 A1 * 6/2013 Lofton ............ G08G 1/096791
455/42
2022/0208193 A1 * 6/2022 Klug ................ G01S 7/4813

* cited by examiner

*Primary Examiner* — Linda Wong
(74) *Attorney, Agent, or Firm* — Warn Partners, P.C.

(57) ABSTRACT

A voice activation system for a vehicle. The voice activation system for a vehicle which has at least one sound panel capable of providing vibrations of a user's voice from the outside of the vehicle into an inside area of the vehicle. A laser listening device is operably connected to the panel for receiving vibrations from a user's voice. A controller receives a pre-identified command of the user from the laser listener and operates an action in the vehicle in response thereto.

18 Claims, 4 Drawing Sheets

(51) Int. Cl.
*G07C 9/00* (2020.01)
*G08C 23/00* (2006.01)

VOICE ACTIVATION USING A LASER LISTENER

CROSS-REFERENCE TO RELATED APPLICATIONS

This application claims the benefit of U.S. Non-Provisional application Ser. No. 16/515,539 filed on Jul. 18, 2019; which is a national stage application of PCT/IB/050969, filed Feb. 16, 2018 claiming the benefit of U.S. Provisional Application No. 62/459,914 filed on Feb. 16, 2017. The disclosures of the above applications are incorporated herein by reference.

FIELD OF THE INVENTION

The present invention relates to a voice activation system for a vehicle that accurately detects operator commands from the outside of the vehicle.

BACKGROUND OF THE INVENTION

Voice command devices are finding more use in society today such as: for calling and controlling phones; searching on the internet from web connected devices; and, the like. Vehicles have harnessed this technology for entering and controlling data in navigation systems and "smart" radio systems often found in passenger vehicles today.

These voice command devices are typically found in the controlled interior of a vehicle where the microphones and electronics necessary to effectively operate the voice controlled device are in a known sound and weather protected environment. Because the area outside a vehicle is unpredictable in both weather and sound, voice control coming from outside of the vehicle has not been readily practical, even though controlling activities such as: opening vehicle doors; starting the vehicle, turning operation and safety lights on and off; emergency alerts or other commands which might be desirable for controlling from the outside of the vehicle are desirable. In addition, microphones mounted on the outside of a vehicle for voice activation are susceptible to water, dust, and dirt that will affect their lifespan and performance. This adds to the complexity of using voice commands from the outside of the vehicle.

Therefore, there remains a need in the art to solve these problems and provide a mechanism for voice control which is reliable for voice control of vehicle functions from outside of the vehicle.

SUMMARY OF THE INVENTION

In accordance with the present invention there is provided a voice activation system for a vehicle. The voice activation system for a vehicle includes providing a vehicle which has at least one sound panel capable of providing vibrations of a user's voice from the outside of the vehicle into an inside area of the vehicle. A laser listening device is operably connected to the panel for receiving said vibrations from a user's voice. A controller is used for receiving a pre-identified command of the user and operating an action in the vehicle in response thereto.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

In accordance with the present invention there is provided a voice activation system 10 for a vehicle 12. The voice activation system 10 has at least one sound panel which are depicted as the driver side window 14, passenger side window 14', front windshield 14" and rear window 14'". It is within the scope of this invention for the at least one sound panel to be any window of a passenger compartment 13. It is also within the scope of this invention for the at least one sound panel to be an exterior vehicle body panel such as a door panel, lift gate, trunk or any other exterior panel. The at least one sound panel is capable of reverberating vibrations of a user's voice from the outside of the vehicle 12 into an inside area of the vehicle 12.

Figure 1:
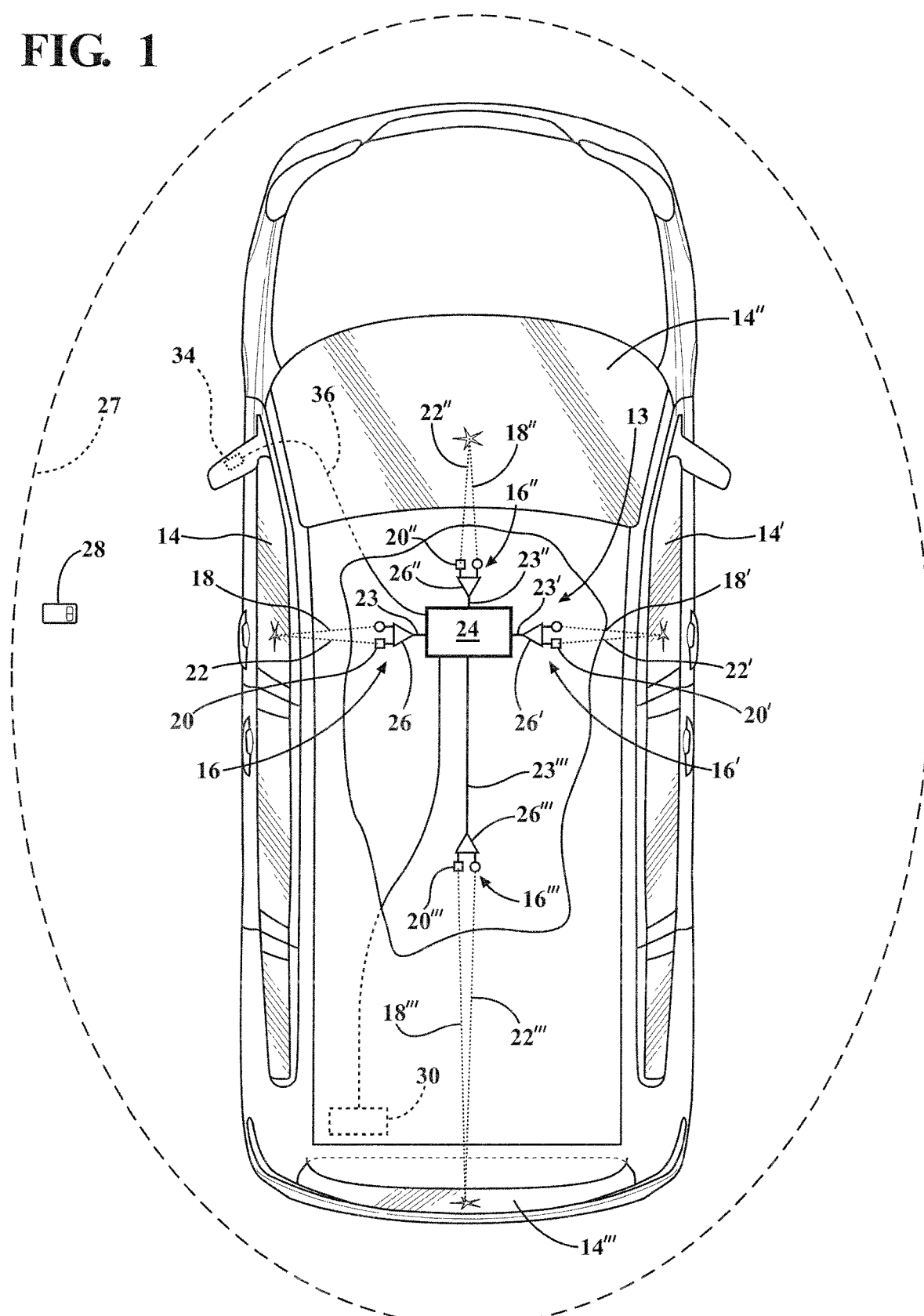
FIG. 1 depicts an overhead schematic view of a vehicle with the laser listening devices positioned relative to the window panels of the vehicle.

In FIG. 1 there is a laser listening device 16, 16', 16", 16'" associated respectively with one of the driver side window 14, passenger side window 14', front windshield 14" and rear window 14'". Each the laser listening device 16, 16', 16", 16'" is mounted inside of the passenger compartment 13 in a location that allows a clear line of sight between the laser listening device 16, 16', 16", 16'" and respective at least one sound panel. Examples of mounting locations include but are not limited to the headliner, head rests, mirror housings, door panels, instrument panel etc.

The laser listening device 16, 16', 16", 16'" uses the laser beam 18, 18', 18", 18'" projected from a laser source, to detect vibrations from a user's voice that are reverberated by the at least one sound panel. The laser listening device 16, 16', 16", 16'" includes a photo sensor 20, 20', 20", 20'" that receives a reflected beam 22, 22', 22", 22'" off the at least one sound panel, which is received by the photo sensor 20, 20', 20", 20'". The angle of reflection off the at least one sound panel is ideally 90 degrees or perpendicular to the at least one sound panel, however, it is possible for other angles to be use such as 45 degrees, 70 degrees, 25 degrees or any other suitable angle depending on the particular design requirements. The laser listening device 16, 16', 16", 16'" then generates a laser listening signal 23, 23', 23", 23'" to a controller 24 that is indicative of the vibrations detected by the laser listening device 16, 16', 16", 16'". The laser listening signal 23, 23', 23", 23'" can be a signal based on the comparison of the laser beam 18, 18', 18", 18'" and the reflected beam 22, 22', 22", 22'" using a comparator 26, 26', 26", 26'" that is part of the laser listening device 16, 16', 16", 16'" hardware. Alternatively the laser listening signal 23, 23', 23", 23'" includes two data sets, one being a value for the laser beam 18, 18', 18", 18'" and a second being a value for the reflected beam 22, 22', 22", 22'" which are then received by and interpreted by the controller 24.

FIG. 1 depicts one laser listening device 16, 16', 16", 16'" associated with a single sound panel. However, it is within the scope of this invention for one laser listening device to associate with multiple sound panels using multiple laser beams and photo sensors provided that the single laser listening device is positioned at a location that provide sufficient line of sight with multiple sound panels.

The controller 24 uses the laser listening signal 23, 23', 23", 23'" to determine the presence of a pre-identified command of the user and then operates an actuator 30 in the vehicle 12 in response to the pre-identified command. The type of actuator 30 can include but is not limited to door unlocking, door opening, window opening, vehicle ignition, vehicle lights, opening rear lift gate or trunk and emergency functions such as sounding the horn and flashing the vehicle lights. The type of command can be preset or learned by the controller 24 using setup software programmed into the controller 24 and will include spoken words like "start", "open liftgate", "unlock", "lock", "lights on", "lights off", "help", "open windows", "close windows" or any other verbal commands in any type of spoken language. In order to provide extra security, the voice activation system 10 is optionally programmed to only operate when a key fob or other identification device 28 such as a smartphone is detected within a predetermined distance from the vehicle 12, depicted in FIG. 1 as a perimeter circle 27 around vehicle 12. This will ensure that the voice command being detected is that of the vehicle owner.

Figure 2:
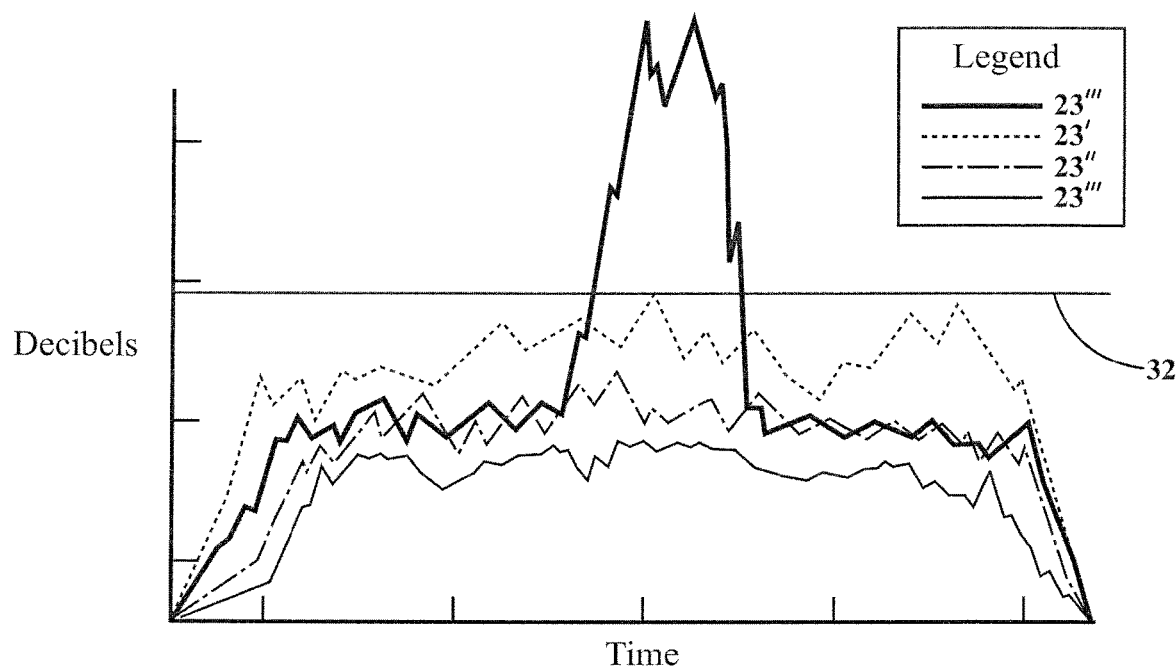
FIG. 2 shows an illustrative graph of the different signals received from by the controller.

In FIG. 1 the controller 24 is depicted to receive the laser listening signal 23, 23', 23", 23'" from multiple laser listening devices 16, 16', 16", 16'". The controller 24 has voice activation software programmed thereon that it either preprogrammed with or learns the different commands. The voice activation software can also perform analysis of each laser listening signal 23, 23', 23", 23'" in order to determination variations in vibrations at each of the sound panels, thereby filtering out ambient noise that can be interpreted as false command signals. FIG. 2 depicts a graph of each laser listening signal 23, 23', 23", 23'" received by the controller 24 plotted as decibels over time. As shown the laser listening signal 23 has several large peaks that are higher than the lines for laser listening signal 23', 23", 23'". A line 32 has been drawn horizontally across the graph to illustrate that the decibel readings below line 32 are ambient noise readings that the voice activation software program will filter out and ignore as ambient noise, while focusing on the peak values of the laser listening signal 23 to determine if a real command has been given. FIG. 2 contains just one example of the filtering operations performed by the controller 24 using the voice activation software programmed thereon. It is possible that the controller can perform other filtering operations where there are more complex overlapping signal values. It is also within the scope of this invention for the controller to communicate with and utilize pre-existing onboard speech recognition software that resides on other hardware in the vehicle, such as in the vehicle electronic control unit, entertainment unit or other control unit.

In another aspect of the invention shown in FIG. 1 the voice activation system 10 includes a microphone 34 mounted to the exterior of the vehicle 12. The microphone 34 as shown is mounted to a side view mirror and "listens" to sounds outside of the vehicle 12. It is within the scope of this invention for the microphone 34 to be mounted to other locations on the external surface of the vehicle 12 or at locations on the interior of the vehicle 12, for example the microphone 34 can be mounted to bumpers, spoilers, or in the actual body panels of the vehicle 12. The microphone 34 provides a microphone signal 36 to the controller 14 that is interpreted with other data to filter our ambient noise, thereby improving the accuracy of the voice activation system. Additionally microphones are used in combination with the laser listening devices 16, 16', 16", 16'" at other locations in the vehicle and not just externally on the vehicle. For example in FIG. 3 a microphone 34' is mounted on the inside surface of a moveable liftgate 36, since when the liftgate 36 is swung open the laser listening device 16'" might not work because the rear window 14'" has been swung out of the line of sight for the laser beam 18'". In such a case the microphone 34' will be able to "listen" for a command from a user, for example a command to close the liftgate 36 can now be detected.

Figure 3:
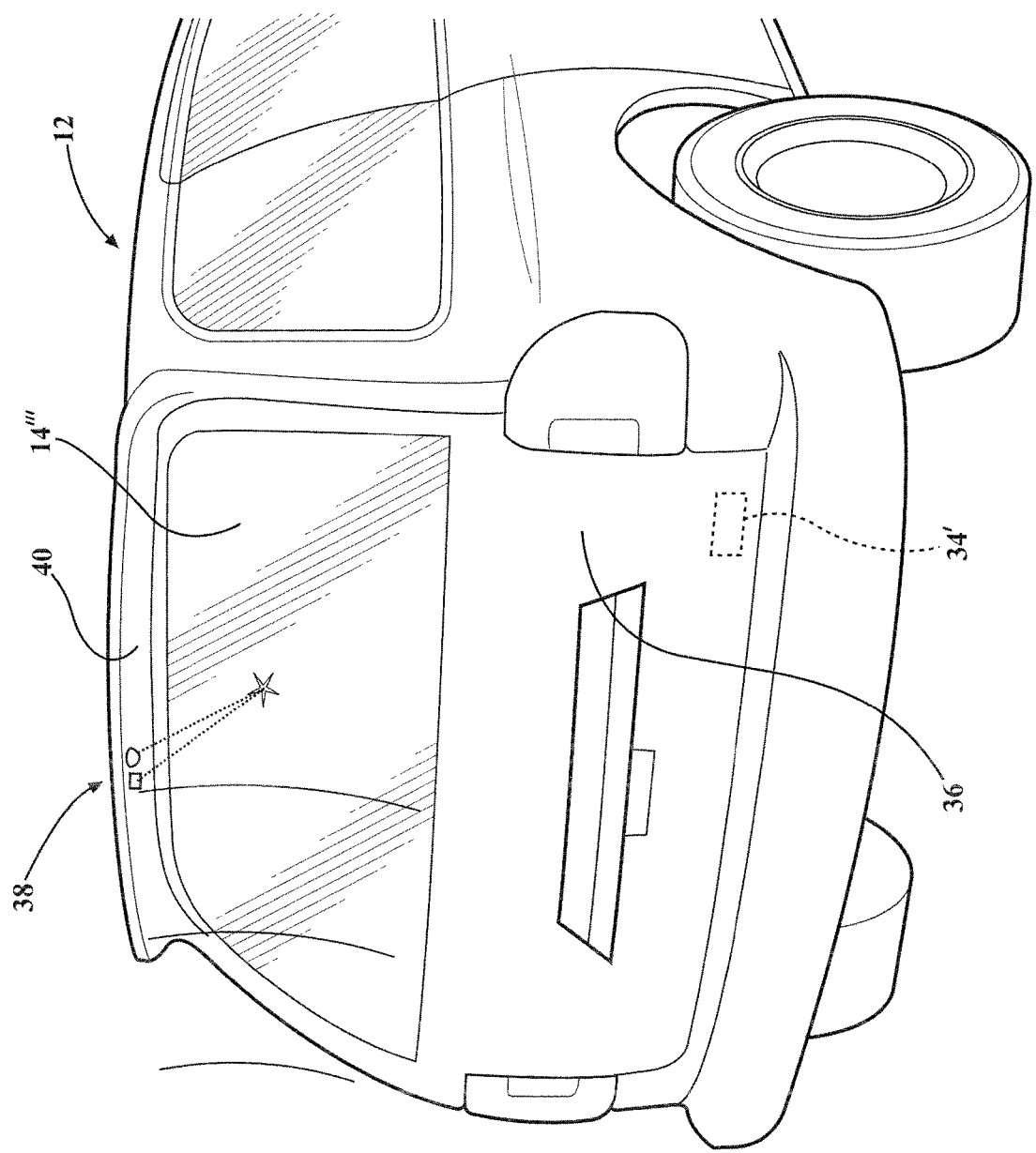
FIG. 3 is a side view of the rear of a vehicle with the laser listening device located on the exterior of the vehicle.
Figure 3:
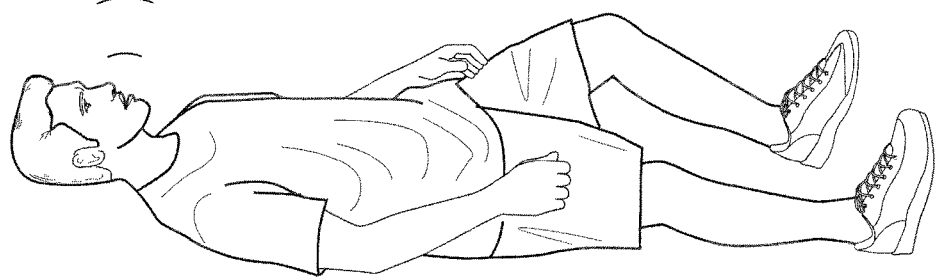

Also shown in FIG. 3 is a laser listening device 38 mounted to the exterior surface of the vehicle 12. In this embodiment the laser listening device 38 is mounted to a rear spoiler 40 that overhangs the rear window 14'". It is within the scope of this invention to position the laser listening devices on other external surfaces of the vehicle 12 at other locations that overhang or extend past the at least one sound panel. Additional possible locations include, but are not limited to spoilers, center high mounted stop lamp housings, backup camera housings, door handles, side view mirrors and one exterior door panels.

Figure 4:
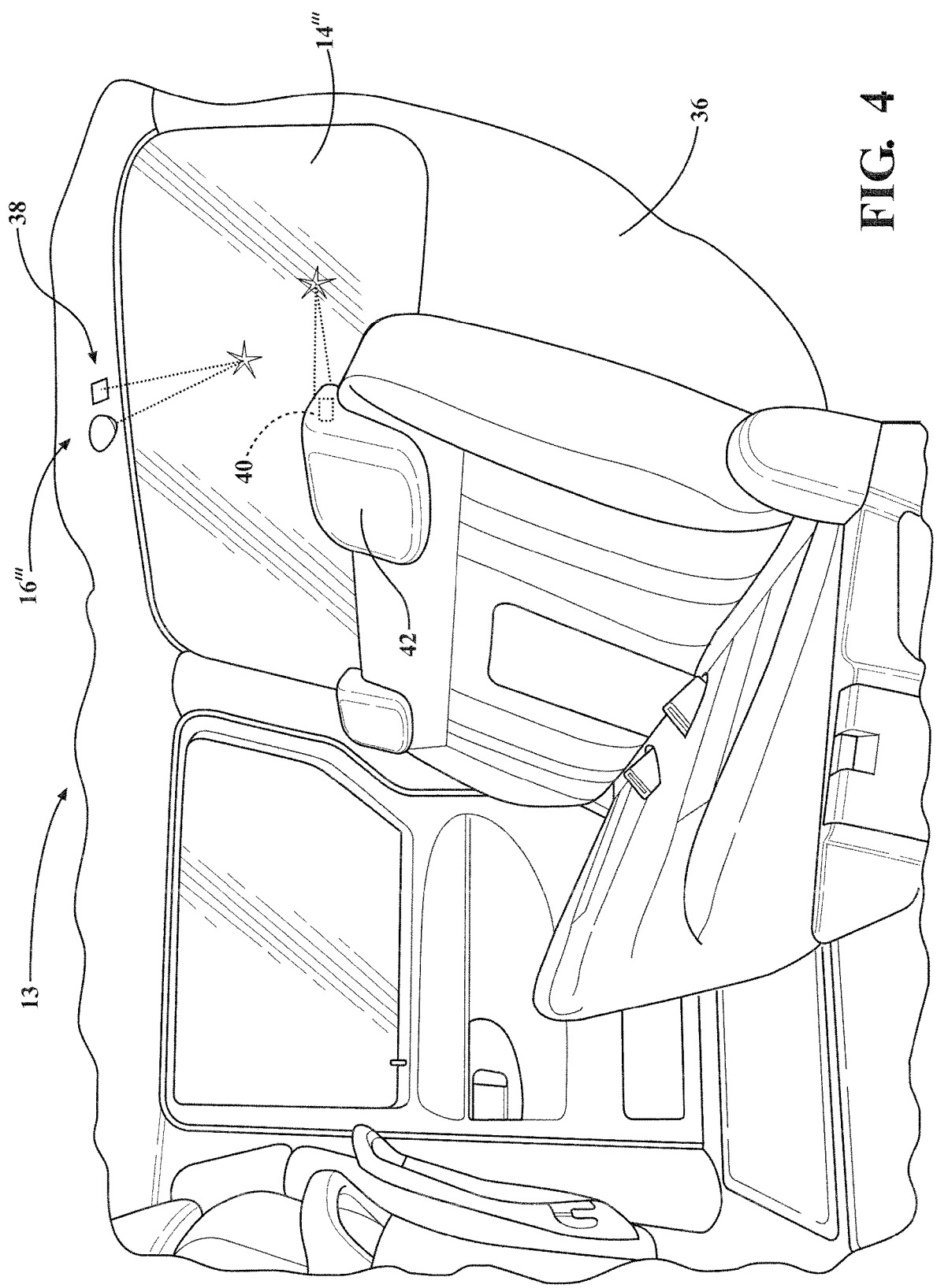
FIG. 4 depicts an interior perspective view of the inside passenger compartment of a vehicle with the laser listening device mounted to the headliner.

FIG. 4 depicts a perspective view of the laser listening device 16'" mounted to a headliner 38 on the inside passenger compartment 13 of the vehicle 12. The laser listening device 16'" projects the laser beam 18'" onto the rear window 14'" of a vehicle liftgate 36. The laser beam 18'" is reflected creating a reflected beam 22'" that is detected by the photo sensor 20'". Also shown in an alternate placement of a laser listening device 40 in a head rest 42, which projects a laser beam and receives a reflected beam onto the rear window 14'". Such placement can be used in applications where different reflected beam reflection angles are desired.

Figure 5:
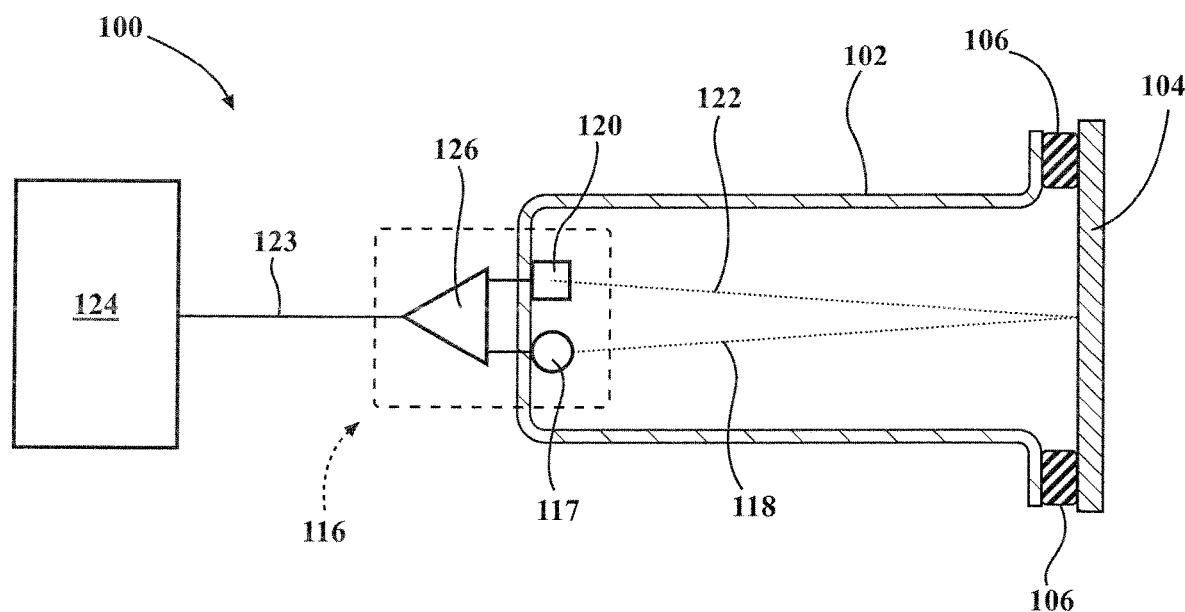
FIG. 5 is a schematic view of an alternate embodiment of a voice activation system.

FIG. 5 is a schematic view of an alternate embodiment of a voice activation system 100. This particular embodiment has an optional closed system in that there is optionally a housing 102 with the sound panel 104 connected to the housing 102 in a way that the sound panel 104 can reverberate vibrations from the exterior environment. To assist in allowing the sound panel 104 to vibrate there is a spring or rubber grommet 106 between the sound panel 104 and a flange of the housing 102. The sound panel 104 can be made of any suitable material that allows sound to reverberate through the sound panel 104 and can include glass, plastic, metal or any other material. At an end of the housing 102 opposite the sound panel 104 there is a laser listening device 116 that has a laser beam source 117 the projects a laser beam 118 toward the surface of the sound panel 104 in a manner similar to the embodiment described above. The laser beam 118 strikes and reflects off the surface of the sound panel 104, thereby creating a reflected beam 122. The reflected beam 122 is detected by a photosensor 120 that is part of the laser listening device. Signals from the photosensor 120 and the laser beam source 117 are optionally send to a comparator 126, which then generates a laser listening signal 123 that is transmitted to a controller 124. The laser listening signal 123 is based on a comparison of the laser beam 118 and the detected reflective beam 122.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A voice activation system for a vehicle comprising:
a vehicle which includes at least one sound panel capable of reverberating vibrations of a user's voice from the outside of the vehicle;
a laser listening device mounted to a headliner on the inside passenger compartment of the vehicle, the laser listening device projects a laser beam onto a rear window of a vehicle liftgate that is reflected creating a reflected beam that is detected by a photo sensor of the laser listening device allowing for detection of vibrations from a user's voice that are reverberated by the at least one panel, the laser listening device generates a laser listening signal that are indicative of the vibrations detected by the laser listening device, wherein the laser beam, and
a controller for receiving the laser listening signal and determining the presence of a pre-identified command of the user and operating an action in the vehicle in response thereto.

2. The voice activation system for a vehicle of claim 1 wherein the controller is a computer device connect to the vehicle and includes voice activation software programmed onto the controller.

3. The voice activation system for a vehicle of claim 2 wherein said controller also includes control hardware operationally connected to the vehicle for controlling at least one action in the vehicle.

4. The voice activation system for a vehicle of claim 3 wherein the at least one action is one selected from the group including door unlocking, door opening, window opening, vehicle ignition, vehicle lights, opening rear lift gate or trunk, and emergency.

5. The voice activation system of claim 1 wherein the laser beam reflects off the rear window at an angle of about 90 degrees.

6. The voice activation system of claim 1 further comprising a microphone mounted to the exterior of the vehicle, configured to detect sound from the outside of the vehicle and generate a listening signal to the controller, wherein the controller receives both the microphone listening signal and the laser listening signal and performs a comparison to filter out ambient noise from outside the vehicle.

7. A voice activation system for a vehicle comprising:
a vehicle which includes at least one sound panel capable of reverberating vibrations of a user's voice from the outside of the vehicle;
a laser listening device mounted to head rest on the inside passenger compartment of the vehicle, the laser listening device projects a laser beam onto a rear window of a vehicle liftgate that is reflected creating a reflected beam that is detected by a photo sensor of the laser listening device allowing for detection of vibrations from a user's voice that are reverberated by the at least one panel, the laser listening device generates a laser listening signal that are indicative of the vibrations detected by the laser listening device, wherein the laser beam, and
a controller for receiving the laser listening signal and determining the presence of a pre-identified command of the user and operating an action in the vehicle in response thereto.

8. The voice activation system for a vehicle of claim 7 wherein the controller is a computer device connect to the vehicle and includes voice activation software programmed onto the controller.

9. The voice activation system for a vehicle of claim 8 wherein said controller also includes control hardware operationally connected to the vehicle for controlling at least one action in the vehicle.

10. The voice activation system for a vehicle of claim 9 wherein the at least one action is one selected from the group including door unlocking, door opening, window opening, vehicle ignition, vehicle lights, opening rear lift gate or trunk, and emergency.

11. The voice activation system of claim 9 wherein the laser beam reflects off the rear window at an angle of about 90 degrees.

12. The voice activation system of claim 9 further comprising a microphone mounted to the exterior of the vehicle, configured to detect sound from the outside of the vehicle and generate a listening signal to the controller, wherein the controller receives both the microphone listening signal and the laser listening signal and performs a comparison to filter out ambient noise from outside the vehicle.

13. A method of operating a voice activation system on a vehicle comprising the steps of:
providing a vehicle which includes a plurality of window panels each having an outside surface exposed to the exterior of the vehicle and an inside surface exposed to an interior of a passenger compartment of the vehicle;
providing a plurality of laser listening devices located in the interior of the passenger compartment, wherein in each one of the plurality of laser listening devices is positioned relative to the interior surface of a respective one of the plurality of window panels, wherein teach of the plurality of laser listening devices has a laser for projecting a laser beam and a photosensor;
providing a controller having voice activation software programmed on the controller having a pre-identified commands programmed thereon;
generating a laser beam from each of the plurality of laser listening devices onto the inside surface of the respective one of the plurality of window panels and creating a reflected beam that is detected by the photo sensor;
generating a laser listening signal from each of the plurality of laser listening devices and transmitting the laser listening signal to the controller;
using the controller and the voice activation software to perform an analysis of each laser listening signal in order to determine variations in vibrations at each of the plurality of window panels and filtering ambient noise as a result of the analysis;
using the controller to determine is a pre-identified command of a user is present in the laser listening signal;
operating an actuator of a vehicle in response to the pre-identified command.

14. The method of claim 13 wherein the actuator is used to perform one selected from the group comprising door unlocking, door opening, window opening, vehicle ignition, vehicle lights, opening rear lift gage, opening trunk and emergency functions.

15. The method of claim 13 wherein the pre-identified command is a spoken verbal command of any type of spoken language.

16. The method of claim 15 further comprising the steps of:
- providing a setup software programmed into the controller allowing the voice activation software to one or more learn spoken word commands; and
- training the controller by the user to learn the one or more spoken word commands.

17. The method of claim 13 further comprising the steps of:
- providing an identification device capable of being sensed by the controller;
- providing a predetermined distance around the vehicle;
- operating the actuator only when the identification device is detected within the predetermined distance of the vehicle.

18. The method of claim 17 wherein the identification device is a key fob or smart phone.

* * * * *